Nov. 29, 1966    F. W. KUSSY ET AL    3,288,975
PUSH BUTTON OPERATED CRISS CROSS ACTUATORS
Filed Dec. 28, 1964    2 Sheets-Sheet 1
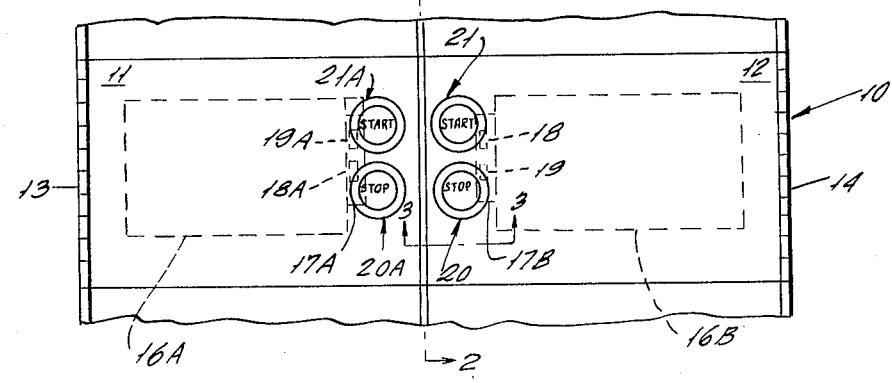
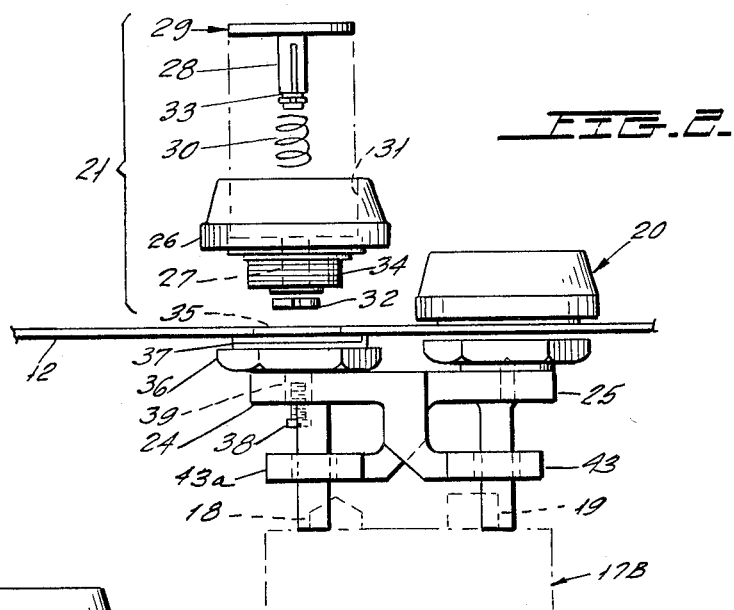
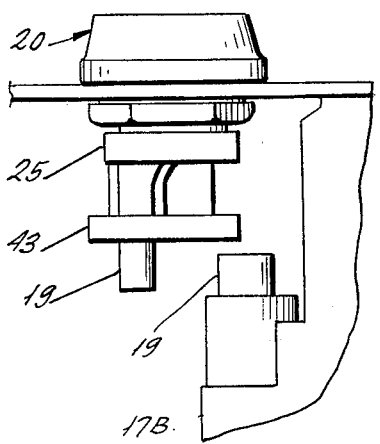
INVENTORS
FRANK W. KUSSY
GEORGE H. FARNSWORTH
BY
OSTROLENK, FABER, GERB & SOFFEN
ATTORNEYS

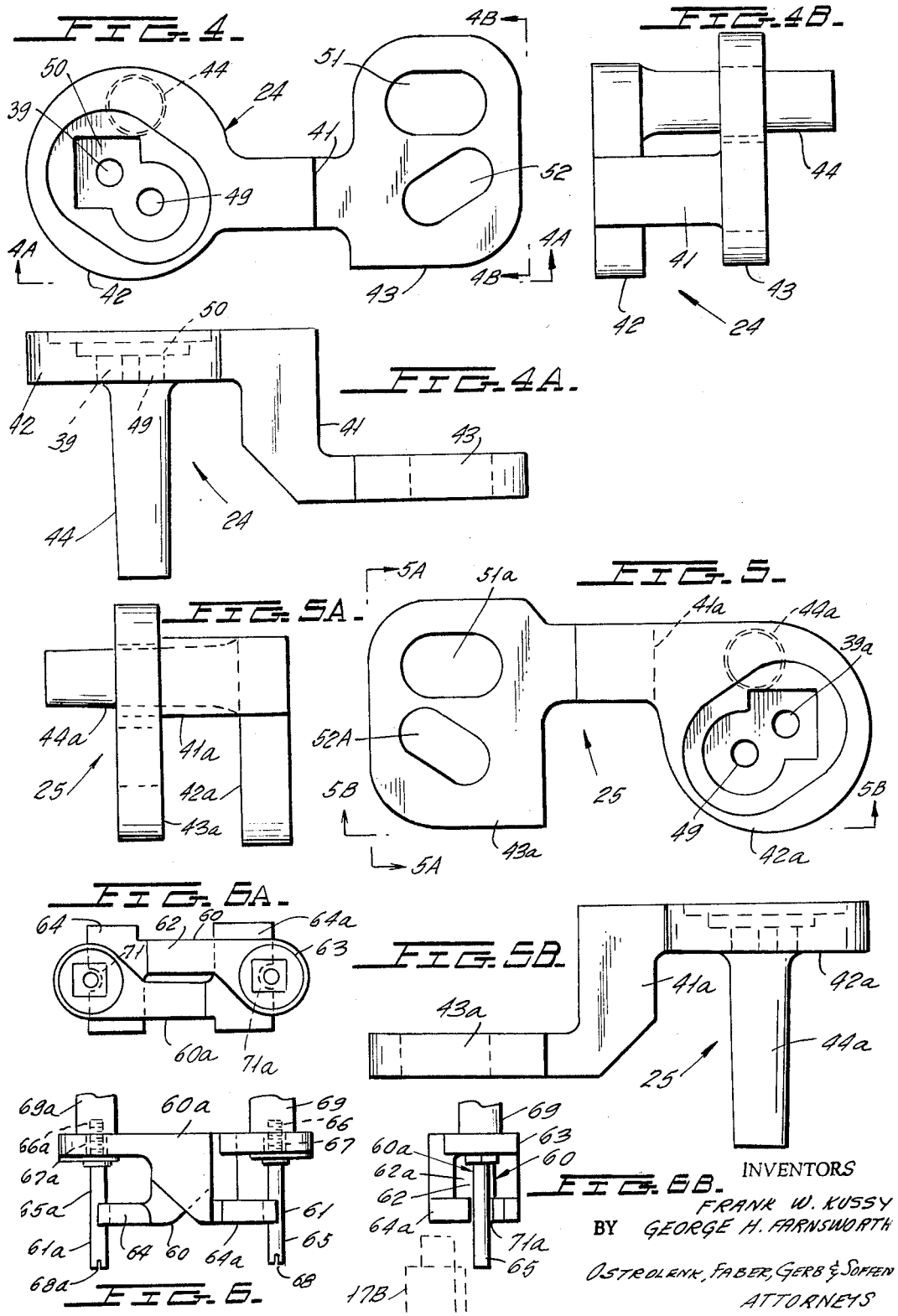

United States Patent Office 3,288,975
Patented Nov. 29, 1966

3,288,975
PUSH BUTTON OPERATED CRISS CROSS
ACTUATORS
Frank W. Kussy, Birmingham, and George H. Farnsworth, Grosse Pointe Woods, Mich., assignors to I-T-E Circuit Breaker Company, Philadelphia, Pa., a corporation of Pennsylvania
Filed Dec. 28, 1964, Ser. No. 421,567
10 Claims. (Cl. 200—172)

This invention relates to enclosures for electrical devices in general and more particularly relates to novel means for arranging control buttons mounted to the enclosure cover in a logical sequence notwithstanding the fact that the controls of devices mounted within enclosure are arranged in a different sequence.

Many electrical control centers are provided with motor starters mounted in an enclosure having one or more openable covers. The starters are provided with their individual controls which are operated by the push buttons mounted to the enclosure cover.

Because of practical considerations primarily governed by the making of electrical connections to the starters, the starters are often positioned so that considered as a grouping the controls thereof are arranged in an illogical sequence. More particularly, it is often advantageous to mount two starters with the line sides thereof facing one another. In such case the start control of one starter is next to the stop control of the other starter and vice-versa. From the viewpoint of operating starters this is a highly undesirable arrangement in that a confusing picture is presented to the operator.

This invention provides novel means whereby the push button controls on the enclosure cover are arranged in a logical sequence. That is, with the starters having their line ends facing one another the start-stop controls of one starter are arranged in a line parallel to the line in which the start-stop controls of the other starter are disposed with the start control of one unit mounted next to the stop control of the other unit and the stop control of the first unit mounted next to the start control of the second unit. However, the push buttons mounted to the cover are arranged in two parallel lines in which the start buttons are next to one another and the stop buttons are next to each other.

This is accomplished by mounting the start and stop buttons for one of the starters in substantial alignment in corresponding controls of the starter. For the other starter a set of criss-cross actuators are mounted to the start-stop push buttons so that each of these push buttons actuates the control more remote therefrom.

Accordingly, a primary object of the instant invention is to provide novel means for arranging the enclosure mounted push buttons of a control center in a logical sequence even though the most convenient electromechanical arrangement of the electrical devices within the enclosure presents an illogical control arrangement.

Another object of this invention is to provide a simple and inexpensive means for arranging cover mounted push buttons in a convenient sequence differing from the positions for the corresponding controls of electrical devices mounted within the enclosure.

Still another object is to provide enclosure cover mounted push buttons with criss-cross actuators constructed so that each of the push buttons actuates the electrical device control more remote therefrom.

These as well as other objects of this invention shall become readily apparent after reading the following description of the accompanying drawings in which:

FIGURE 1 is a fragmentary front elevation of an enclosure showing two electrical devices mounted therein with push buttons mounted to the enclosure and arranged in a logical sequence by means constructed in accordance with the teachings of the instant invention.

FIGURE 2 is a side elevation, looking in the direction of arrows 2—2 of FIGURE 1, showing the relationship between a pair of criss-cross actuators and the push buttons to which the actuators are mounted.

FIGURE 3 is a fragmentary elevation looking in the direction of arrows 3—3 of FIGURE 1 showing the relationship between an actuator and the electrical device control operated thereby.

FIGURE 4 is a front elevation of the start actuator.

FIGURES 4A and 4B are additional elevations of the actuator of FIGURE 4 looking in the directions of arrows 4A—4A and 4B—4B, respectively, of FIGURE 4.

FIGURE 5 is a front elevation of the stop actuator.

FIGURES 5A and 5B are additional elevations of the actuator of FIGURE 5 looking in the directions of arrows 5A—5A and 5B—5B, respectively, of FIGURE 5.

FIGURE 6 is a fragmentary elevated view showing criss-cross actuators constituting another embodiment of this invention.

FIGURES 6A and 6B are plan and end views, respectively, of FIGURE 6.

Now referring to the figures and more particularly to FIGURES 1 through 3. Enclosure 10 is generally of rectangular cross section with the front wall thereof constructed as a plurality of openable covers, only two of which, 11, 12, are illustrated in their entireties. Cover 11 is hinged at 13 to the forward edge of the left wall of enclosure 10 while the cover 12 is hinged at 14 to the forward end of the right hand wall of enclosure 10. Mounted to the back wall of enclosure 10 are two identical electrical devices, in this case motor starters 16A, 16B each of a type fully described in the copending Cataldo et al. application, Serial No. 189,915 filed April 24, 1962 entitled Electrical Device, and assigned to the assignee of the instant invention. Since line and load wiring to starters 16A and 16B forms no part of this invention, and is intended to be made in a conventional manner, no description or illustration thereof is included in this application.

Starters 16A and 16B are electromagnetically operated and are mounted so that their holding interlocks 17A and 17B face one another and are equally spaced from the longitudinal axis for enclosure 10. Each of the holding interlocks 17A, 17B is provided with a start and stop push button controls, each depressible towards the rear wall of enclosure 10. As best seen in FIGURE 2, holding interlock 17B is provided with stop control 18 and start control 19. As set forth in detail in the aforesaid application Serial No. 189,915, depressing stop control 18 opens normally closed contact means (not shown) while depressing start control 19 closes normally open contact means (not shown). As best seen in FIGURE 1 the stop control 18A is mounted next to start control 19 of interlock 17B while start control 19A of interlock 17A is mounted next to stop control 18 of interlock 17B.

If these controls 18, 19, 18A, 19A were to be operated by push buttons arranged substantially in alignment therewith this would present a confusing picture to the operator. More particularly, the start button for one interlock would be next to the stop button for the other interlock and vice versa.

Accordingly, the stop button means 20A and the start button means 21A are mounted in substantial alignment with the interlock controls 18A, 19A, respectively. However, the start button means 21 and the stop means 20 operate start and stop controls 19, 18, respectively. This is accomplished by utilizing a pair of actuators 24, 25 mounted in a criss-cross arrangement as best seen in FIGURE 2.

As best seen in FIGURE 2, push button means 21 includes hollow body 26 having bore 27 for guiding movement of stem portion 28 at the lower end of depressible plunger 29. Coil spring 30, disposed within cavity 31 in the upper surface of body 26, urges plunger 29 upwardly with respect to FIGURE 2. C-shaped clip, 32 disposed within annular groove 33 near the lower end of stem 28, limits upward movement of plunger 29. The lower portion 34 of body 26 is of reduced diameter and is provided with external threads. Portion 34 extends through aperture 35 in cover 12 with the threads being engaged by retaining nut 36. Lock washer 37 is interposed between nut 36 in the inner surface of cover 12. Screw 38, extending through clearance aperture 39, is received by a threaded aperture at the free end of stem 28 and secures start actuator 24 to the lower end of push button means 21.

Since stop push button means 20 is of identical construction to start push button means 21 no additional description of stop button means 20 will be given.

Now referring more particularly to FIGURES 4 through 4B for a detailed description of start actuator 24. Actuator 24 is a single element constructed of molded insulating material and includes body 41, head 42, foot 43 and guide leg 44. Head 42 and foot 43 are at opposite ends of body 41 and extend in opposite directions therefrom being disposed in planes substantially parallel to cover 12. Guide leg 44 extends from head 42 alongside of body 41 in a direction generally at right angles to the plane of head 42.

Aperture 39 as well as aperture 49 extend through head 42 and are positioned so that the upper ends thereof enter depression 50 in the upper surface of head 42. Depression 50 is so shaped that portions of the boundaries thereof closely fit the lower end of the push button plunger 28 thereby stabilizing actuator 24 on plunger 28. Foot 43 is provided with guide slot 51, which receives guide leg 44a of stop actuator 25.

Since stop actuator 25 is substantially of the same construction as start actuator 24 no detailed description of the former will be given herein. However, it is noted that portions of actuator 25 corresponding to the same portions of actutator 24 are designated by the same reference numeral with the suffix "a" added. Essentially the only difference between actuators 24 and 25 is the location of the bodies relative to apertures 39, 39a and slots 51, 51a.

With actuators 24, 25 mounted to push button means 21, 20, respectively, guide legs 44, 44a extend into slots 51a, 51 respectively. This positions a portion of foot 43 directly over start control 19 and a portion of foot 43a directly over stop control 18. Thus, when plunger 29 of start control 21 is depressed, foot 43 engages start control 19 and when the plunger 29 of push button means 20 is depressed, foot 43a engages stop control 18.

FIGURES 6 through 6B illustrate another embodiment of this invention in which each of the actuators is constructed of a molded member 60 and a metal pin-like member 61. Member 60 consists of body 62, head 63 and foot 64 with head 63 and foot 64 being positioned at opposite ends of body 62 and extending in opposite directions therefrom. Pin-like member 61 includes guide portion 65 at one end thereof and threaded securing portion 66 at the other end thereof with these portions being separated by outwardly extending shoulder 67.

Securing portion 66 extends upwardly through aperture 67 in head 63 and is received by a threaded aperture in the lower end of the plunger 69 for the push button means (not shown) which operates actuator 60. The free end of guide portion 65 is slotted at 68 to receive a screwdriver for the tightening of securing portion 66. Guide portion 65 is disposed within guide notch 71a in the edge of foot 64a of the other actuator 60a.

Since actuators 60, 60a are of substantially identical construction only the former has been described in detail. Elements of actuator 60a are designated by reference numerals corresponding to those used in the description of actuator 60 with the addition of the suffix "a."

With actuator 60 mounted to push button plunger 69 and actuator 60a mounted to push button plunger 69a it is seen that guide portions 65, 65a of pin means 61, 61a are disposed within guide notches 71a, 71, respectively. When plunger 69 is depressed a portion of foot 64 will engage and operate stop control 18 and when plunger 69a is depressed a portion of foot 64a will engage and operate start control 19.

Thus, this invention provides a novel criss-crossed arrangement for actuators interposed between push button means, mounted to an enclosure, and control elements for an electrical device mounted within the enclosure.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a combination of the class described an electrical device including a first and a second control, an enclosure wherein said device is mounted, said enclosure including a wall, a first and a second push button device, first means secured to said first device and movable therewith for operating said first control when said first device is depressed, second means secured to said second device and movable therewith for operating said second control, said first means including a first guide formation received by and cooperating with a second guide formation of said second means to guide relative movement between said first and second means, said first device positioned closer to said second control than said first control and said second device positioned closer to said first control than said second control.

2. A combination as set forth in claim 1 in which said first and second controls are positioned such that a straight line passing between them is generally parallel to a straight line passing between said first and second devices.

3. In a combination of the class described an electrical device including a first and a second control, an enclosure wherein said device is mounted, said enclosure including a wall, a first and a second push button device, first means secured to said first device and movable therewith for operating said first control when said first device is depressed, second means secured to said second device and movable therewith for operating said second control, said first device positioned closer to said second control than said first control and said second device positioned closer to said first control than said second control, said first and said second means including first and second projections, respectively; said first projection extending into a second formation of said second means and said second projection extending into a first formation of said first means; said projections in cooperation with said formations guiding movement of said means as said push button devices are operated.

4. A combination as set forth in claim 3 in which each of said means also includes a body, a head at one end of said body and a foot at the other end of said body with said head and said foot extending in opposite directions, said heads secured to said push button devices and said feet being engageable with said controls as said push button devices are depressed.

5. A combination as set forth in claim 4 in which said bodies extend generally parallel to the direction of movement of said push button devices as they are operated.

6. A combination as set forth in claim 5 in which said projections extending from said heads generally parallel to said bodies.

7. A combination as set forth in claim 6 in which said heads and said feet are disposed in planes extending generally perpendicular to said bodies.

8. A combination as set forth in claim 7 in which each of said first and second means consist of a single element.

9. A combination as set forth in claim 7 in which said first and said second means include a first and a second element, respectively; said first projection constituting a position of said first element and said second projection constituting a portion of said second element; said first element having another portion securing said first means to said first push button device and said second element having another portion securing said second means to said second push button device.

10. In a combination of the class described an electrical device including a first and a second control, an enclosure wherein said device is mounted, said enclosure including a wall, a first and a second push button device, first means secured to said first device and movable therewith for operating said first control when said first device is depressed, second means secured to said second device and movable therewith for operating said second control, said first means including a first guide formation received by and cooperating with a second guide formation of said second means to guide relative movement between said first and second means, said first and second controls are positioned such that a straight line passing between them is generally parallel to a straight line passing between said first and second devices, said first device positioned closer to said second control than said first control.

No references cited.

MILTON KAUFMAN, *Primary Examiner.*